United States Patent
Borlick et al.

(10) Patent No.: US 10,171,585 B2
(45) Date of Patent: Jan. 1, 2019

(54) METHOD, SYSTEM, AND COMPUTER PROGRAM PRODUCT FOR DISTRIBUTED STORAGE OF DATA IN A HETEROGENEOUS CLOUD

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Roger G. Hathorn, Tucson, AZ (US); Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/961,166

(22) Filed: Dec. 7, 2015

(65) Prior Publication Data

US 2017/0163731 A1    Jun. 8, 2017

(51) Int. Cl.
*G06F 15/167* (2006.01)
*H04L 29/08* (2006.01)
*G06F 3/06* (2006.01)

(52) U.S. Cl.
CPC ........ *H04L 67/1097* (2013.01); *G06F 3/0604* (2013.01); *G06F 3/067* (2013.01); *G06F 3/0629* (2013.01); *G06F 3/0689* (2013.01)

(58) Field of Classification Search
CPC . H04L 67/1097; G06F 21/6218; G06F 3/067; G06F 3/06

USPC .......................................................... 709/213
See application file for complete search history.

(56) References Cited

U.S. PATENT DOCUMENTS

| | | | |
|---|---|---|---|
| 8,654,971 B2 | 2/2014 | Orsini et al. | |
| 8,849,955 B2 | 9/2014 | Prahlad et al. | |
| 9,052,962 B2 | 6/2015 | Lee et al. | |
| 9,075,529 B2 | 7/2015 | Karve et al. | |
| 9,258,765 B1 | 2/2016 | daCosta | |
| 2005/0078702 A1 | 4/2005 | Heuer et al. | |
| 2005/0157662 A1 | 7/2005 | Bingham et al. | |
| 2007/0153763 A1 | 7/2007 | Rampolla et al. | |
| 2007/0204089 A1 | 8/2007 | Proctor | |
| 2008/0148063 A1 | 6/2008 | Hanko et al. | |
| 2009/0300707 A1 | 12/2009 | Garimella et al. | |
| 2010/0325199 A1 | 12/2010 | Park et al. | |
| 2012/0042162 A1* | 2/2012 | Anglin ................ | G06F 21/57 713/165 |
| 2012/0116846 A1 | 5/2012 | Levy et al. | |

(Continued)

OTHER PUBLICATIONS

Morozan, I. Multi-Clouds Database: A New Model to Provide Security in Cloud Computing. Available online: https://www.researchgate.net/publication/273136522 (accessed on Apr. 1, 2015).*

(Continued)

*Primary Examiner* — Taylor A Elfervig
(74) *Attorney, Agent, or Firm* — Rabindranath Dutta; Konrad Raynes Davda & Victor LLP

(57) ABSTRACT

Provided are a method, a system, and a computer program product in which a computational device stores a first part of data in a first cloud storage maintained by a first entity. A second part of the data is stored in a second cloud storage maintained by a second entity.

20 Claims, 11 Drawing Sheets

(56) References Cited

U.S. PATENT DOCUMENTS

| | | | |
|---|---|---|---|
| 2012/0303736 | A1 | 11/2012 | Novotny et al. |
| 2013/0086283 | A1 | 4/2013 | Miller et al. |
| 2013/0086415 | A1 | 4/2013 | Petersen et al. |
| 2013/0179985 | A1 | 7/2013 | Strassmann et al. |
| 2013/0204849 | A1* | 8/2013 | Chacko .................. G06F 3/0604 707/692 |
| 2014/0181901 | A1 | 6/2014 | Markel et al. |
| 2014/0201541 | A1 | 7/2014 | Paul et al. |
| 2015/0052354 | A1 | 2/2015 | Purohit |
| 2015/0304343 | A1 | 10/2015 | Cabrera et al. |
| 2015/0347489 | A1* | 12/2015 | Sherwin ............ G06F 17/30345 707/722 |
| 2015/0379292 | A1* | 12/2015 | Lewis .................. G06F 21/6218 713/165 |
| 2016/0004611 | A1 | 1/2016 | Lakshman et al. |
| 2016/0162693 | A1 | 6/2016 | Breuer et al. |
| 2017/0160951 | A1 | 6/2017 | Borlick et al. |
| 2017/0163772 | A1 | 6/2017 | Borlick et al. |

OTHER PUBLICATIONS

Jianzong Wang, Weijiao Gong, Peter Varman, and Changsheng Xie. 2012. Reducing Storage Overhead with Small Write Bottleneck Avoiding in Cloud RAID System. In Proceedings of the 2012 ACM/IEEE 13th International Conference on Grid Computing (GRID '12). IEEE Computer Society, Washington, DC, USA, 174-183.*

M. Schnjakin and C. Meinel, "Evaluation of Cloud-RAID: A Secure and Reliable Storage above the Clouds," 2013 22nd International Conference on Computer Communication and Networks (ICCCN), Nassau, 2013, pp. 1-9.*

M. Schnjakin, T. Metzke and C. Meinel, "Applying Erasure Codes for Fault Tolerance in Cloud-RAID," 2013 IEEE 16th International Conference on Computational Science and Engineering, Sydney, NSW, 2013, pp. 66-75.*

Arora, I., & Gupta, A. (2012). Cloud Databases: A Paradigm Shift in Databases. International Journal of Computer Science Issues, 9(4), 77-83.*

Wu Qiyue, "Research on column-store databases optimization techniques," 2015 International Conference on Logistics, Informatics and Service Sciences (LISS), Barcelona, 2015, pp. 1-7.*

Curino, Carlo et al. "Relational Cloud: A Database-as-a-Service for the Cloud." 5th Biennial Conference on Innovative Data Systems Research, CIDR 2011, Jan. 9-12, 2011 Asilomar, California.*

Mowbray, M., Pearson, S., Shen, Y.: Enhancing privacy in cloud computing via policy-based obfuscation. The Journal of Supercomputing, 1-25 (2010).*

B. S. Rawal, R. K. Karne and Q. Duan, "Split-System: The New Frontier of Cloud Computing," 2015 IEEE 2nd International Conference on Cyber Security and Cloud Computing, New York, NY, 2015, pp. 374-381.*

X. Zhang, H. t. Du, J. q. Chen, Y. Lin and L. j. Zeng, "Ensure Data Security in Cloud Storage," 2011 International Conference on Network Computing and Information Security, Guilin, 2011, pp. 284-287.*

List of IBM Patents or Patent Applications Treated as Related, dated Dec. 7, 2015, pp. 2.

Singh, et al., "A Secured Cost-Effective Multi-Cloud Storage in Cloud Computing," IEEE INFOCOM 2011 Workshop on Cloud Computing, IEEE, pp. 625-630, 2011.

Alice, et al., "Enhancing Security of Multi-Cloud Architecture using Combination of Approaches," 2015 IJSRSET, v.1, i.2, pp. 250-253, Mar.-Apr. 2015.

U.S. Appl. No. 14/961,247, filed Dec. 7, 2015.

U.S. Appl. No. 14/961,208, filed Dec. 7, 2015.

Response dated Aug. 10, 2016, pp. 12, to Office Action dated May 10, 2016, pp. 23, for U.S. Appl. No. 14/961,247, filed Dec. 7, 2015.

Response dated Aug. 22, 2016, pp. 12, to Office Action dated May 20, 2016, pp. 20, for U.S. Appl. No. 14/961,208, filed Dec. 7, 2015.

Office Action dated May 10, 2016, pp. 23, for U.S. Appl. No. 14/961,247, filed Dec. 7, 2015.

Office Action dated May 20, 2016, pp. 20, for U.S. Appl. No. 14/961,208, filed Dec. 7, 2015.

Response dated Feb. 27, 20107, pp. 14, to Final Office Action dated Nov. 25, 2016, pp. 24, for U.S. Appl. No. 14/961,208, filed Dec. 7, 2015.

Office Action dated Apr. 20, 2017, pp. 22, for U.S. Appl. No. 14/961,208, filed Dec. 7, 2015.

Final Office Action dated Nov. 25, 2016, pp. 24, for U.S. Appl. No. 14/961,208, filed Dec. 7, 2015.

Response dated Dec. 28, 2016, pp. 12, to Final Office Action dated Sep. 29, 2016, pp. 20, for U.S. Appl. No. 14/961,247, filed Dec. 7, 2015.

Final Office Action dated Sep. 29, 2016, pp. 20, for U.S. Appl. No. 14/961,247, filed Dec. 7, 2015.

Response dated Aug. 22, 2017, pp. 12, to Office Action dated Apr. 20, 2017, pp. 22, for U.S. Appl. No. 14/961,208, filed Dec. 7, 2015.

Ex Parte Quayle dated Aug. 30, 2017, pp. 13, for U.S. Appl. No. 14/961,247, filed Dec. 7, 2015.

Response dated Oct. 30, 2017, pp. 14, to Ex Parte Quayle dated Aug. 30, 2017, pp. 13, for U.S. Appl. No. 14/961,247, filed Dec. 7, 2015.

Notice of Allowance dated Dec. 20, 2017, pp. 22, for U.S. Appl. No. 14/961,247, filed Dec. 7, 2015.

Notice of Allowance dated Nov. 30, 2017, pp. 22, for U.S. Appl. No. 14/961,208, filed Dec. 7, 2015.

Notice of Allowance dated Mar. 1, 2018, pp. 11, for U.S. Appl. No. 14/961,208, filed Dec. 7, 2015.

B. Joan, "Difference Between MTP and MSC", [online][Apr. 16, 2017] http://www.differencebetween.net/technology/difference-between-mtp-and-rnsc, pp. 5.

Notice of Allowance dated Jun. 26, 2018, pp. 22, for U.S. Appl. No. 14/961,247, filed Dec. 7, 2015.

* cited by examiner

METHOD, SYSTEM, AND COMPUTER PROGRAM PRODUCT FOR DISTRIBUTED STORAGE OF DATA IN A HETEROGENEOUS CLOUD

BACKGROUND

1. Field

Embodiments relate to a method, system, and computer program product for distributed storage of data in a heterogeneous cloud.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller.

Redundant array of independent disks (RAID) is a data storage virtualization technology that combines multiple disk drive components into a single logical unit for data redundancy or performance improvement. Data is distributed across the drives in one of several ways, referred to as RAID levels, depending on the specific level of redundancy and performance required. The different schemes or architectures are named by the word RAID followed by a number (e.g. RAID 0, RAID 1). Each scheme provides a different balance among the goals of reliability, availability, performance, and capacity. For example, RAID levels greater than RAID 0 provide protection against unrecoverable read errors, as well as whole disk failures.

SUMMARY OF THE PREFERRED EMBODIMENTS

Provided are a method, a system, and a computer program product in which a computational device stores a first part of data in a first cloud storage maintained by a first entity. A second part of the data is stored in a second cloud storage maintained by a second entity.

In certain embodiments, the computational device is a storage controller coupled to a plurality of hosts, wherein the first cloud storage is separated at least by 10 kilometers from the second cloud storage, and wherein the first entity and the second entity are different vendors that provide cloud computing services to the storage controller for the plurality of hosts.

In further embodiments, a plurality of cloud storages maintained by a plurality of entities are structured as a redundant array of independent disks (RAID) by a RAID management application that executes in the computational device.

In additional embodiments, data information and parity information in the RAID are stored in cloud storages provided by different entities.

In yet additional embodiments, different types of entries of a database are stored in cloud storages provided by different entities.

In further embodiments, different regions of a spreadsheet are stored in cloud storages provided by different entities.

In yet further embodiments, data elements of the data that are indicated by an identical identifier are stored in cloud storages provided by different entities.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

There are many security and data loss issues associated with cloud storage. For example, storing password on a cloud storage may have security issues because if the cloud storage is compromised than the password may be stolen and may be used in an unauthorized manner. If a cloud device that stores the password fails, then the password information may be lost.

Certain embodiments ensure security and avoid data loss by providing cloud storages from different vendors, i.e., by providing a heterogeneous cloud storage environment. Certain embodiments stripe information across the various cloud storages by configuring RAID arrays from the various cloud storages. If a cloud storage is not operational or inaccessible, the data or parity may be read from the remaining cloud storages to reconstruct the data on the missing cloud storage.

Certain embodiments divide the data into multiple parts, and consistently stores different parts of the data in different cloud storage devices maintained by different vendors. For example, by storing the first half of a password in one cloud storage and by storing the other half of the password in another cloud storage greater security may be provided against theft and unauthorized use of password. If one of the cloud storage is compromised then only a part of a password may be compromised. The embodiments may be implemented with or without encryption of the parts of the data. As a software defined storage interface, elements of a database may be persistently assigned to be stored to different clouds in such a way as to minimize the impact of the loss of any one element, in the event of a one or more compromised cloud storages.

Exemplary Embodiments

Figure 1:
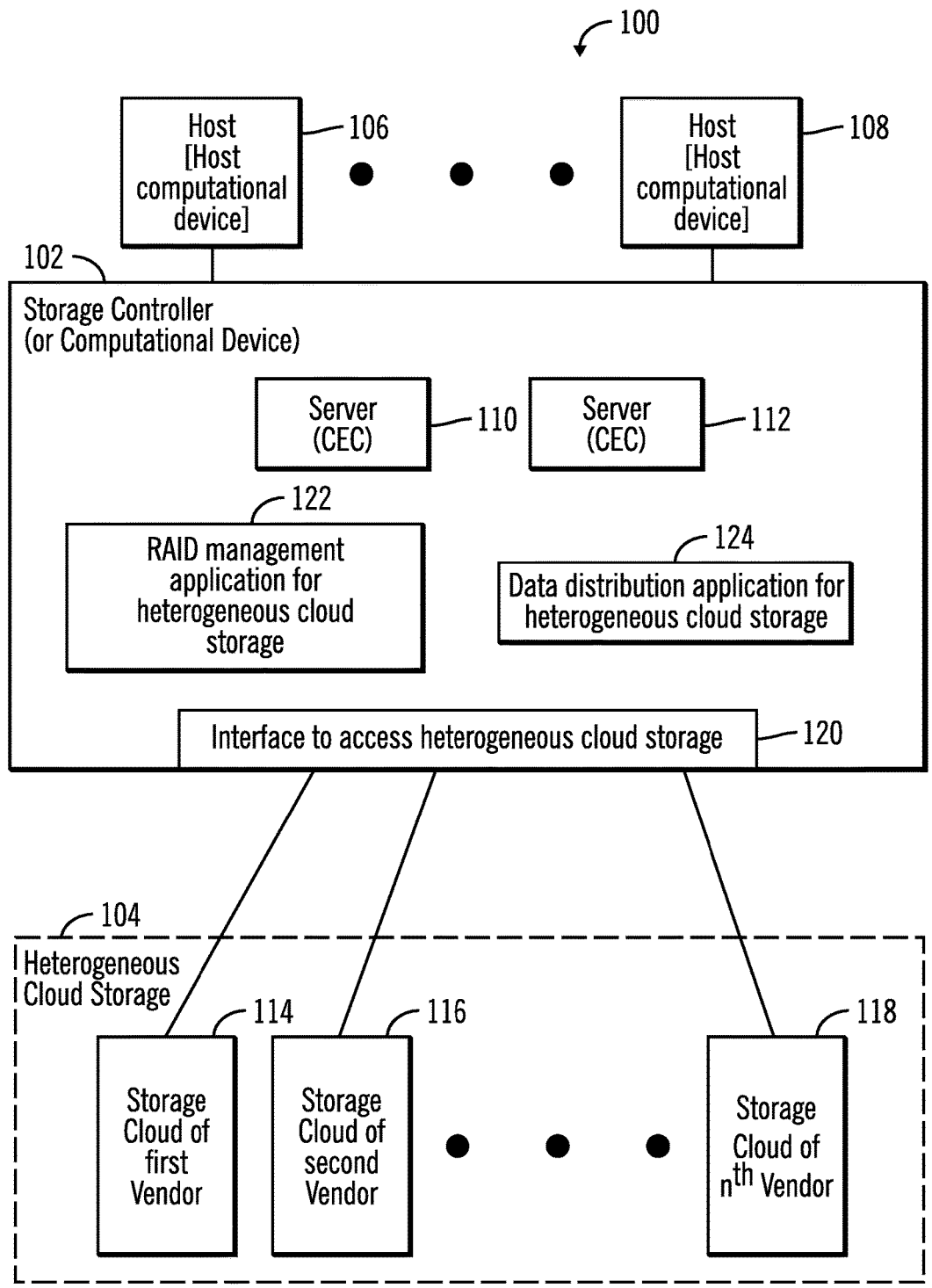
FIG. 1 illustrates a block diagram of a computing environment comprising a storage controller coupled to a heterogeneous cloud storage, in accordance with certain embodiments.

FIG. 1 illustrates a block diagram of a computing environment 100 comprising a storage controller 102 coupled to a heterogeneous cloud storage 104, in accordance with certain embodiments. The storage controller 102 allows a plurality of host computational devices 106, 108 to perform input/output (I/O) operations with logical storage maintained by the storage controller 102. The physical storage corresponding to the logical storage is found in the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, etc. The servers 110, 112 of the storage controller 102, the storage controller 102, and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server. In certain embodiments, the servers 110, 112 of the storage controller 102, the storage controller 102, the hosts 106, 108, and the heterogeneous cloud storage 104 may be elements in a cloud computing environment that comprises the computing environment 100.

The heterogeneous cloud storage 104 may be comprised of a plurality of storage clouds 114, 116, 118 where each of the plurality of storage clouds may be provided and maintained by a different entity. For example, a first vendor may provide the storage cloud 114, a second vendor may provide the storage cloud 116, and a third vendor may provide the storage cloud 118. The different storage clouds may be placed at different geographical locations separated by a considerable distance, such as at least 10 kilometers.

Each storage cloud 114, 116, 118 may be comprised of a plurality of storage devices, such as storage disks, tape drives, solid state storage, etc., that are maintained by a storage server that has an operating system. In certain embodiments, the storage cloud 114 maintained by the first vendor may have one operating system, whereas the storage cloud 116 maintained by the second vendor may have another operating system.

The storage controller 102 may have an interface 120 to access the heterogeneous cloud storage 104. A RAID management application 122 that configures the heterogeneous cloud storage 104 as a RAID may execute in the storage controller 102. Additionally, a data distribution application 124 that distributes different parts of data in different storage clouds in the heterogeneous cloud storage 104 may execute in the storage controller 102. The RAID management application 122 and the data distribution application 124 may be implemented in software, firmware, or hardware, or any combination thereof, in accordance with certain embodiments.

Figure 2:
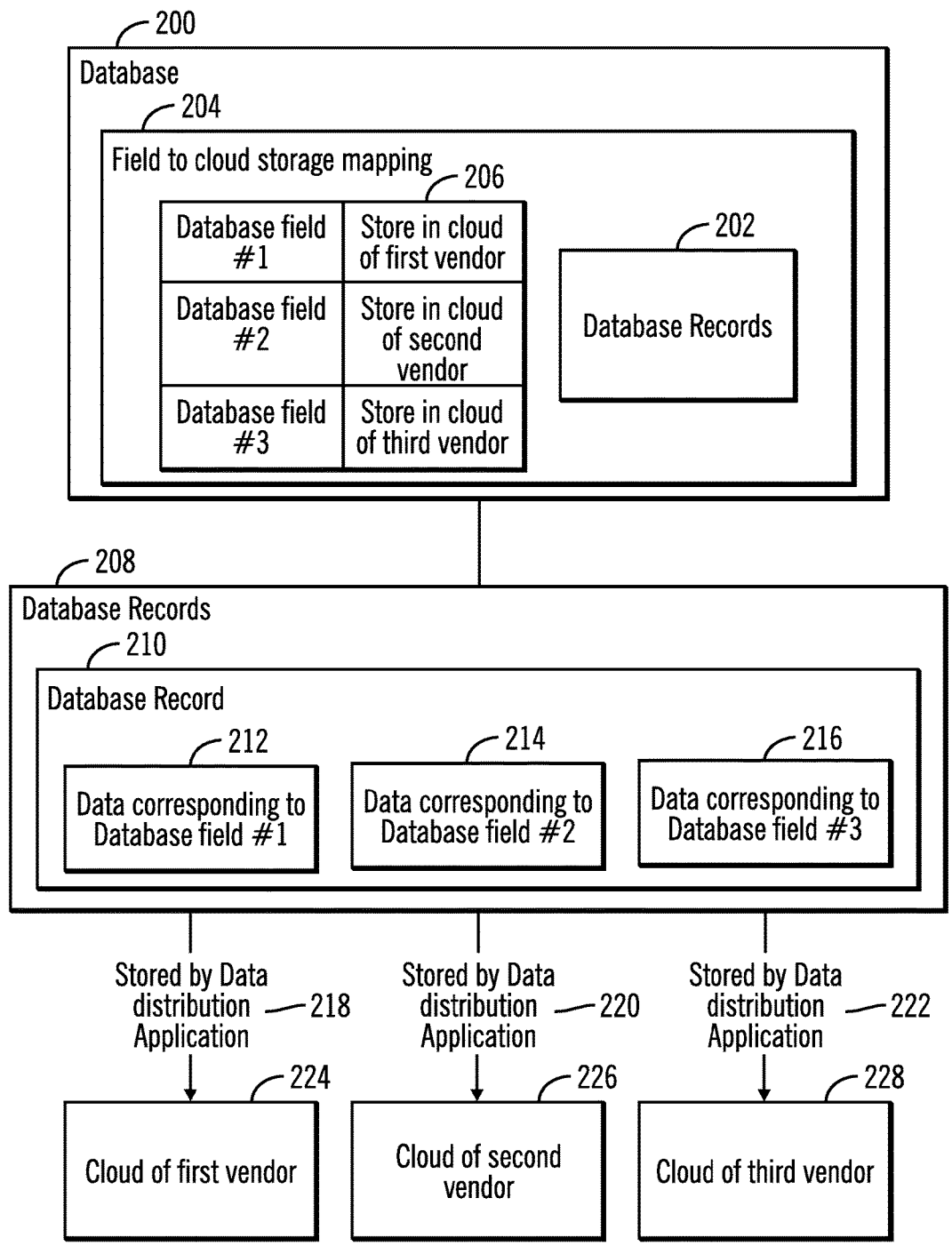
FIG. 2 illustrates a block diagram that shows storing data corresponding to different database fields in cloud storages of different vendors, in accordance with certain embodiments.

FIG. 2 illustrates a block diagram that shows the storing of data corresponding to different database fields in cloud storages of different vendors, in accordance with certain embodiments.

A database 200 may have a plurality of database records 202 where each database record may have a plurality of database fields. A mapping 204 is maintained to map the different database fields to different cloud storages. As shown via reference numeral 206, the database field #1 is to be stored in a cloud storage of a first vendor, the database field #2 is to be stored in a cloud storage of a second vendor, and databased field #3 is to be stored in a cloud storage of a third vendor.

FIG. 2 shows that exemplary database records 208 may include an exemplary database record 210 having data corresponding to database fields #1, #2, #3 respectively (shown via reference numerals 212, 214, 216).

The data distribution application 124 stores (shown via reference numerals 218, 220, 222) the data corresponding to database fields #1, #2, #3 in the clouds 224, 226, 228 of the first vendor, the second vendor, and the third vendor respectively.

Therefore, FIG. 2 shows how different parts of the data are stored in different clouds provided by different vendors to at least provide security for data.

Figure 3:
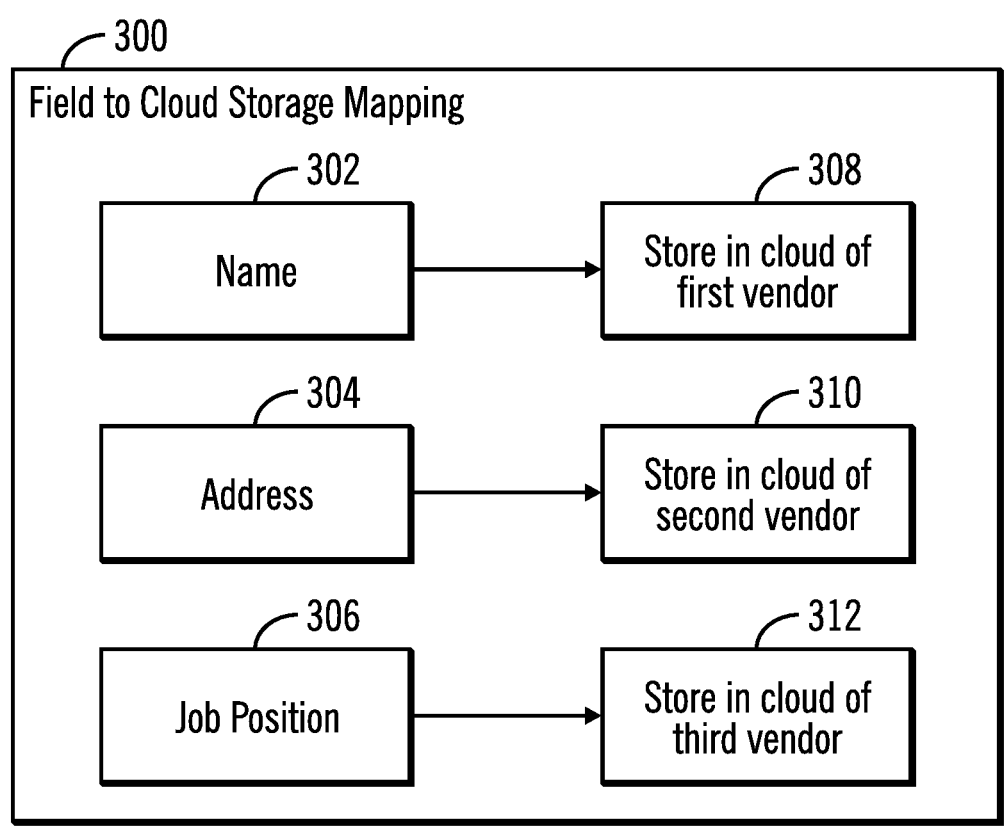
FIG. 3 illustrates a block diagrams that shows names, addresses, and job positions of a record being stored in cloud storages of different vendors, in accordance with certain embodiments.

FIG. 3 illustrates a block diagram 300 that shows names 302, addresses 304, and job positions 306 of a record being stored in cloud storages 308, 310, 312 of different vendors, in accordance with certain embodiments.

Figure 4:
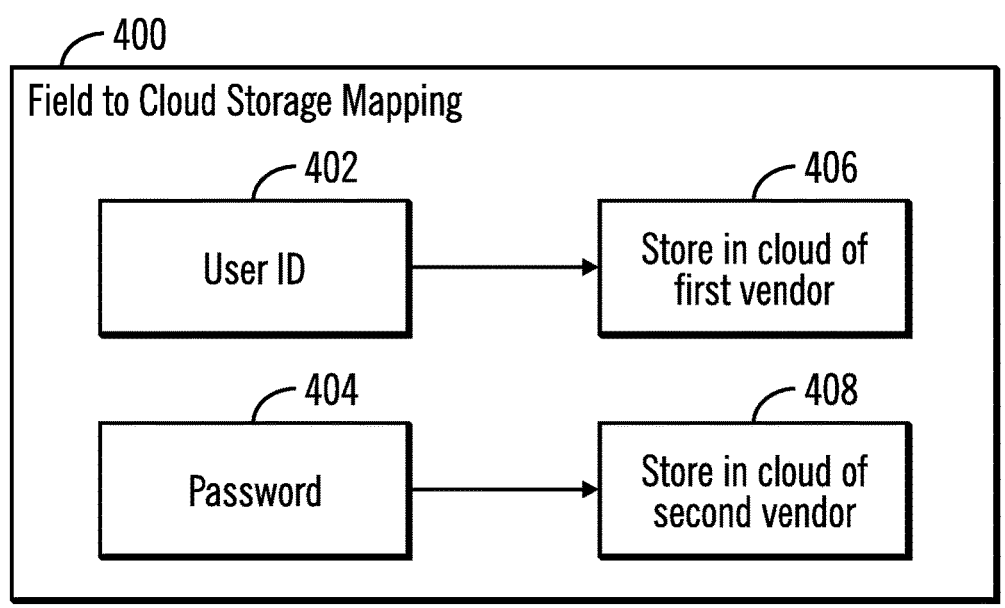
FIG. 4 illustrates a block diagram that shows user ids and corresponding passwords being stored in cloud storages of different vendors, in accordance with certain embodiments.

FIG. 4 illustrates a block diagram 400 that shows user ids 402 and corresponding passwords 404 being stored in cloud storages 406, 408 of different vendors, in accordance with certain embodiments.

Figure 5:
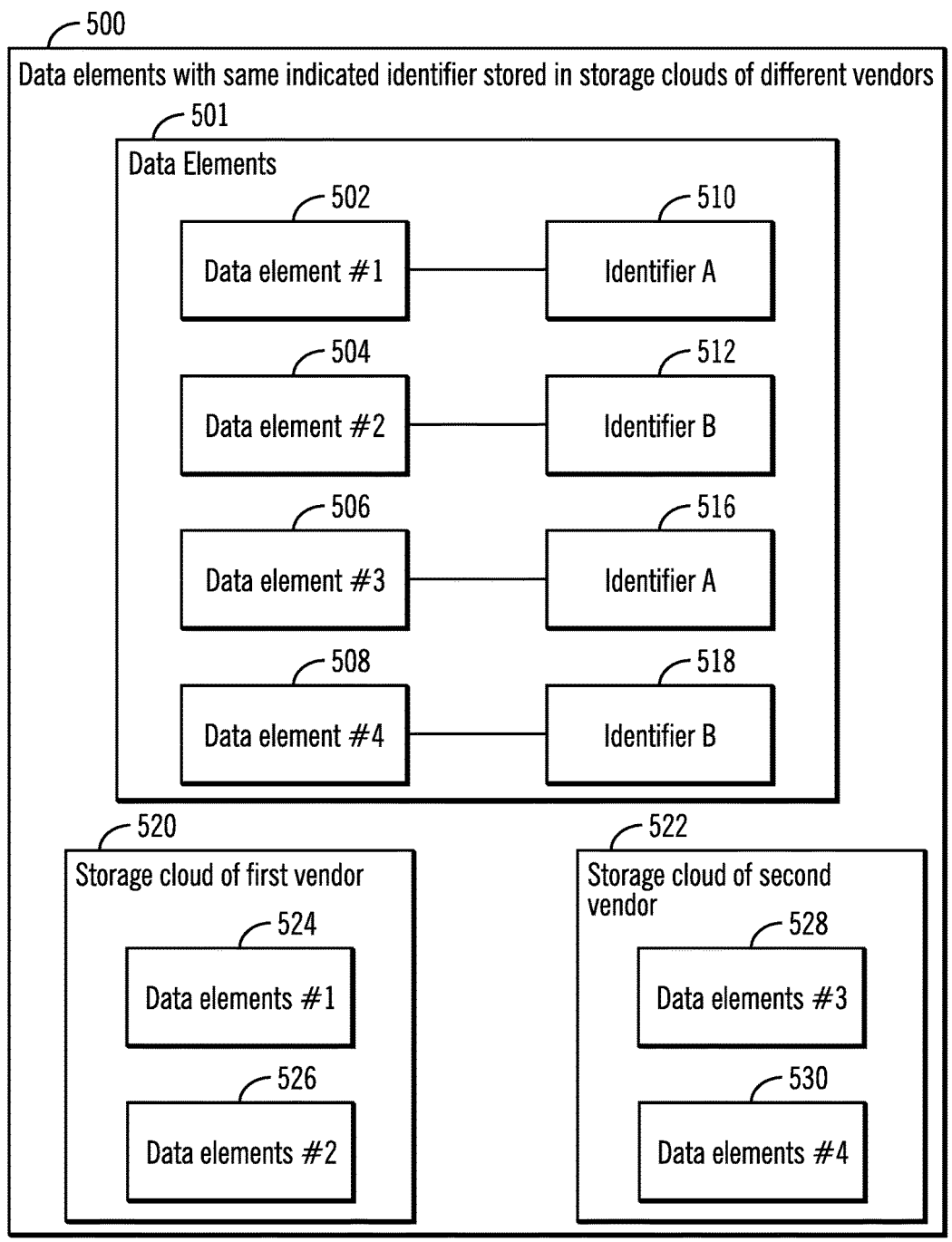
FIG. 5 illustrates a block diagram that shows data elements indicated by the same identifier being stored in cloud storages of different vendors, in accordance with certain embodiments.

FIG. 5 illustrates a block diagram 500 that shows a plurality of data elements 501. Data elements indicated by the same identifier are stored in cloud storages of different vendors, in accordance with certain embodiments. For example, the data elements #1, #3 (reference numerals 502, 506) that are indicated with identifier A 510, 516 are placed in the storage cloud of a first vendor 520 and the storage cloud of a second vendor 522 respectively (as shown via reference numeral 524, 528). Data elements #2, #4 (reference numerals 504, 508) that are indicated with identifier B 512, 518 are placed in the storage cloud of a first vendor 520 and the storage cloud of a second vendor 522 respectively (as shown via reference numeral 526, 530).

For example, a user ID and a password may be encoded with the same identifier (e.g., identifier A) to indicate that they are two keys to the same secure system. The data distribution application 124 then stores the user ID in the storage cloud of one vendor and the password in the storage clouds of another vendor.

Therefore, FIG. 5 shows how information may be coded to classify data that should not be stored together (i.e. data that should be stored on different clouds), such that an application is made aware of the mechanism to manage the data. For example, in a database, a data attribute may be encoded with an identifier that indicates the cloud location in which to place the data. Further, an identifier may be assigned such that no two elements with the same identifier are placed in the same cloud or storage location.

Figure 6:
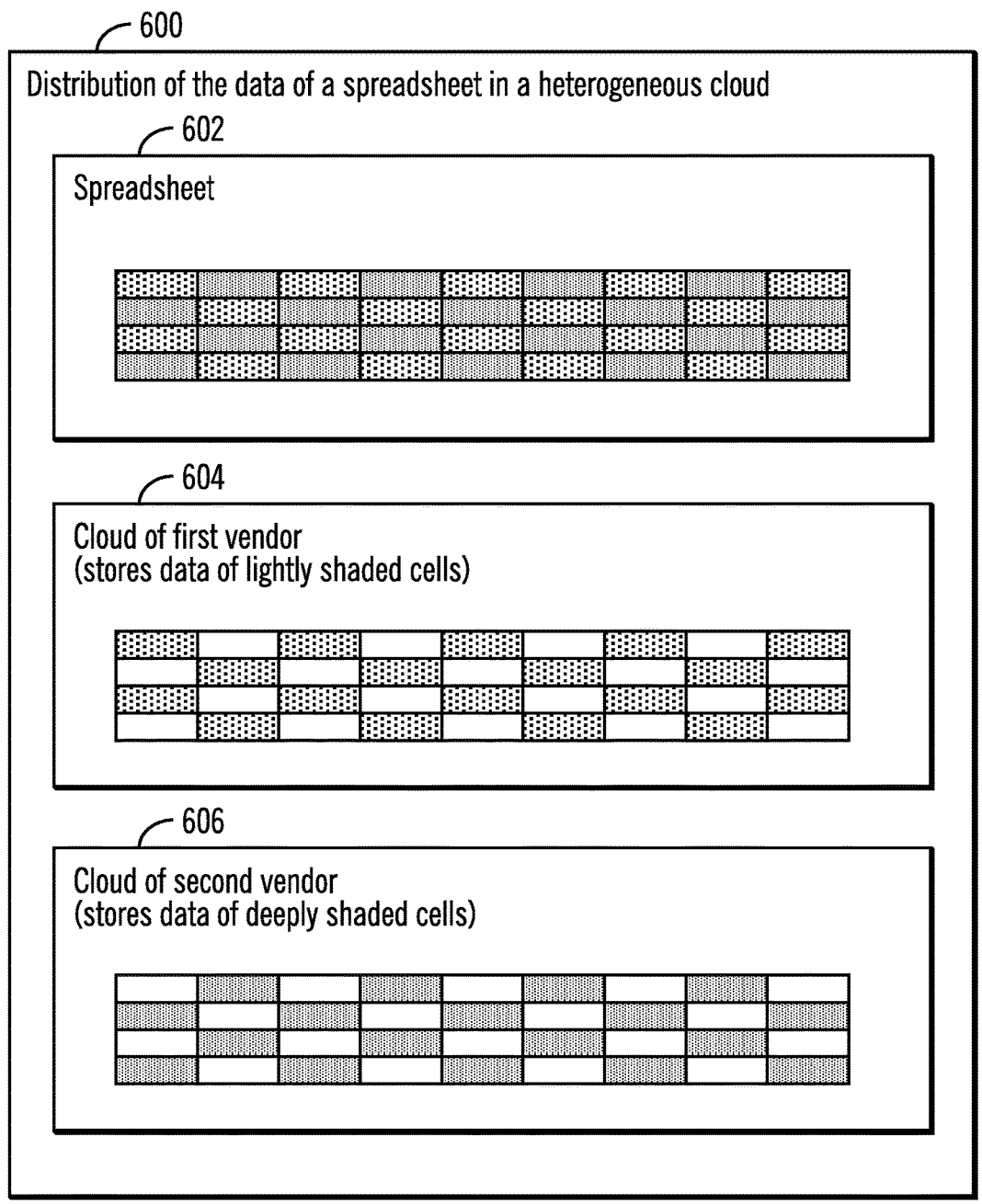
FIG. 6 illustrates a block diagram that shows different regions of a spreadsheet being stored in cloud storages of different vendors, in accordance with certain embodiments.

FIG. 6 illustrates a block diagram 600 that shows different regions of a spreadsheet 602 being stored in cloud storages 604, 606 of different vendors, in accordance with certain embodiments. The cloud storage of first vendor 604 stores the lightly shaded cells, and the cloud storage of the second vendor 606 stores the deeply shaded cells. In other embodiments, data in the spreadsheet may be encoded using even/odd rows, colors, tabs, etc., to separate data that should not be stored in the same location. For example, even rows or columns are not stored with odd rows or columns, or data elements of a like color are not stored together, or items on different tabs are stored separately. Data in other data structures besides spreadsheets or databases may be distributed in a similar manner in other embodiments.

Figure 7:
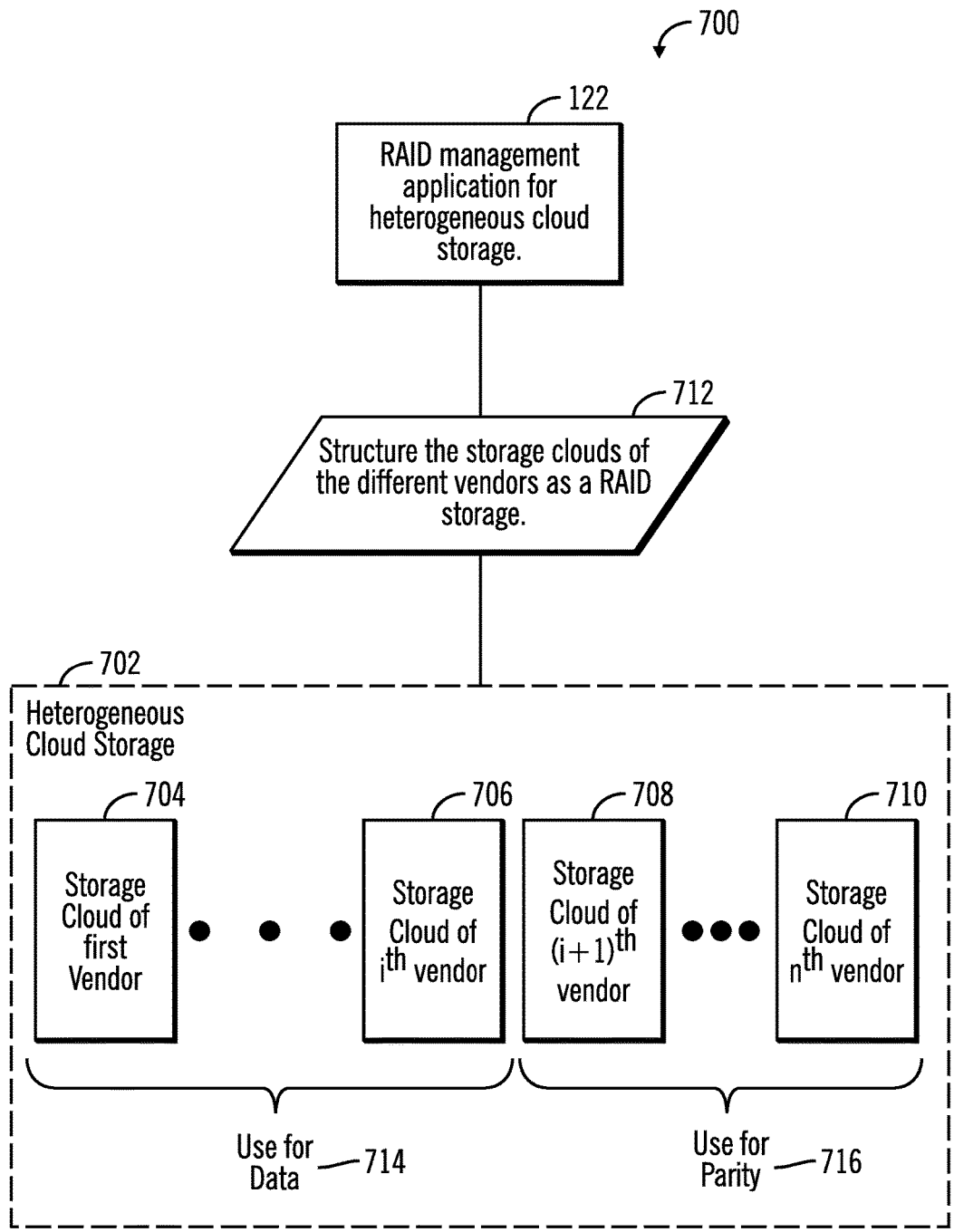
FIG. 7 illustrates a block diagram that shows a heterogeneous cloud storage maintained as a RAID, in accordance with certain embodiments.

FIG. 7 illustrates a block diagram 700 that shows a heterogeneous cloud storage 702 maintained as a RAID, in accordance with certain embodiments. For example, in certain embodiments a RAID array is created by the RAID management application 122, across the various cloud storages 704, 706, 708, 710 from different vendors. The RAID array may be of many different RAID array types, such as RAID-0, RAID-5, RAID-6 or RAID-10. By creating a RAID in the heterogeneous cloud storage 702, information is striped. For example, if one of the cloud storage is compromised then only a part of a password that is distributed across the RAID array may be compromised.

Therefore, FIG. 7 shows that the RAID management application 122 structures the storage clouds of the different vendors as a RAID storage (as shown via the operation shown via reference numeral 712). In additional embodiments, data information and parity information in the RAID are stored in cloud storages provided by different entities (e.g., vendors) as shown via reference numerals 714, 716.

Therefore, certain embodiments provide an application that creates RAID using the various heterogeneous cloud storages. An interface 120 is provided to access the RAID stack/storage. In addition to being the interface for I/O, the interface 120 provides a granularity of striping. For example, a customer may provide indications to stripe at every byte or stripe at every 512 bytes etc., at the time of creation of the RAID array.

Figure 8:
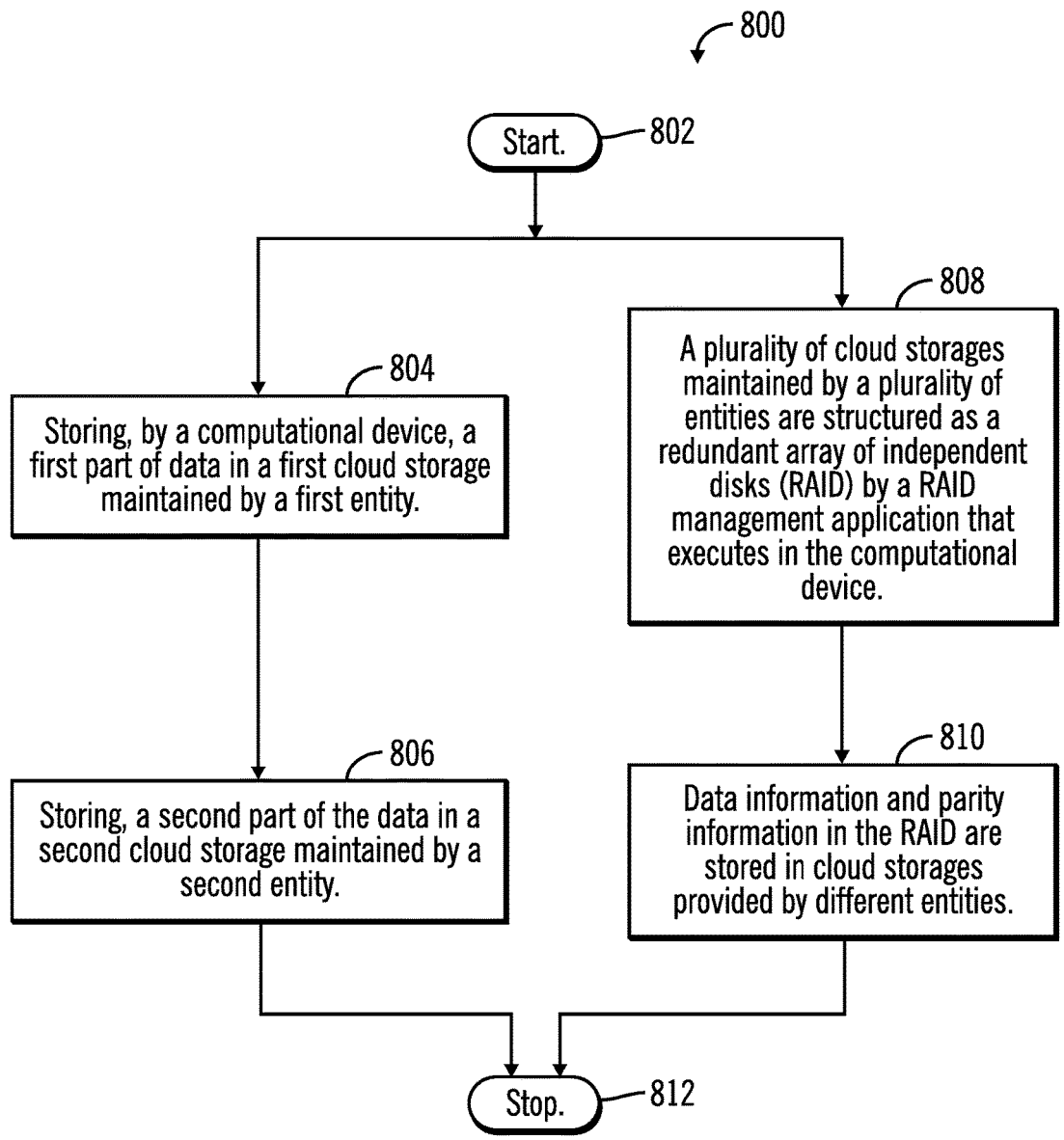
FIG. 8 illustrates a flowchart that shows operations performed by the storage controller, in accordance with certain embodiments.

FIG. 8 illustrates a flowchart 800 that shows operations performed by the storage controller 102, in accordance with certain embodiments. The operations shown in FIG. 8 may be performed by the RAID management application 122 and the data distribution application 124 as shown in FIG. 1.

Control starts at block 802, and proceeds to block 804 in which a computational device stores a first part of data in a first cloud storage 114 maintained by a first entity. A second part of the data is stored (at block 806) in a second cloud storage 116 maintained by a second entity. In certain embodiments, the computational device is a storage controller 102 coupled to a plurality of hosts 106, 108, where the first cloud storage 114 is separated at least by 10 kilometers from the second cloud storage 116, and where the first entity and the second entity are different vendors that provide cloud computing services to the storage controller 102 for the plurality of hosts 106, 108.

In further embodiments, control proceeds from block 802 to block 808 in which a plurality of cloud storages 104 maintained by a plurality of entities are structured as a redundant array of independent disks (RAID) by a RAID management application 122 that executes in the computational device. In additional embodiments, data information and parity information in the RAID are stored (at block 810) in cloud storages 104 provided by different entities. From blocks 806, 810 the process shown in FIG. 8 may proceed to terminate operations (as shown via reference numeral 812).

The operations of block 804 and 806 may be performed subsequent to the operations of block 808, 810 or in parallel to blocks 808, 810. In other words, the storing of the first part of data and the second part of data in different cloud storages may be performed in parallel or after the creation of RAID arrays.

Therefore, FIGS. 1-8 illustrate certain embodiments to distribute different parts of data to cloud storages provided by different vendors. Additionally, RAID arrays may be formed from cloud storage provided by different vendors, As a result, security and redundancy may be provided for data.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
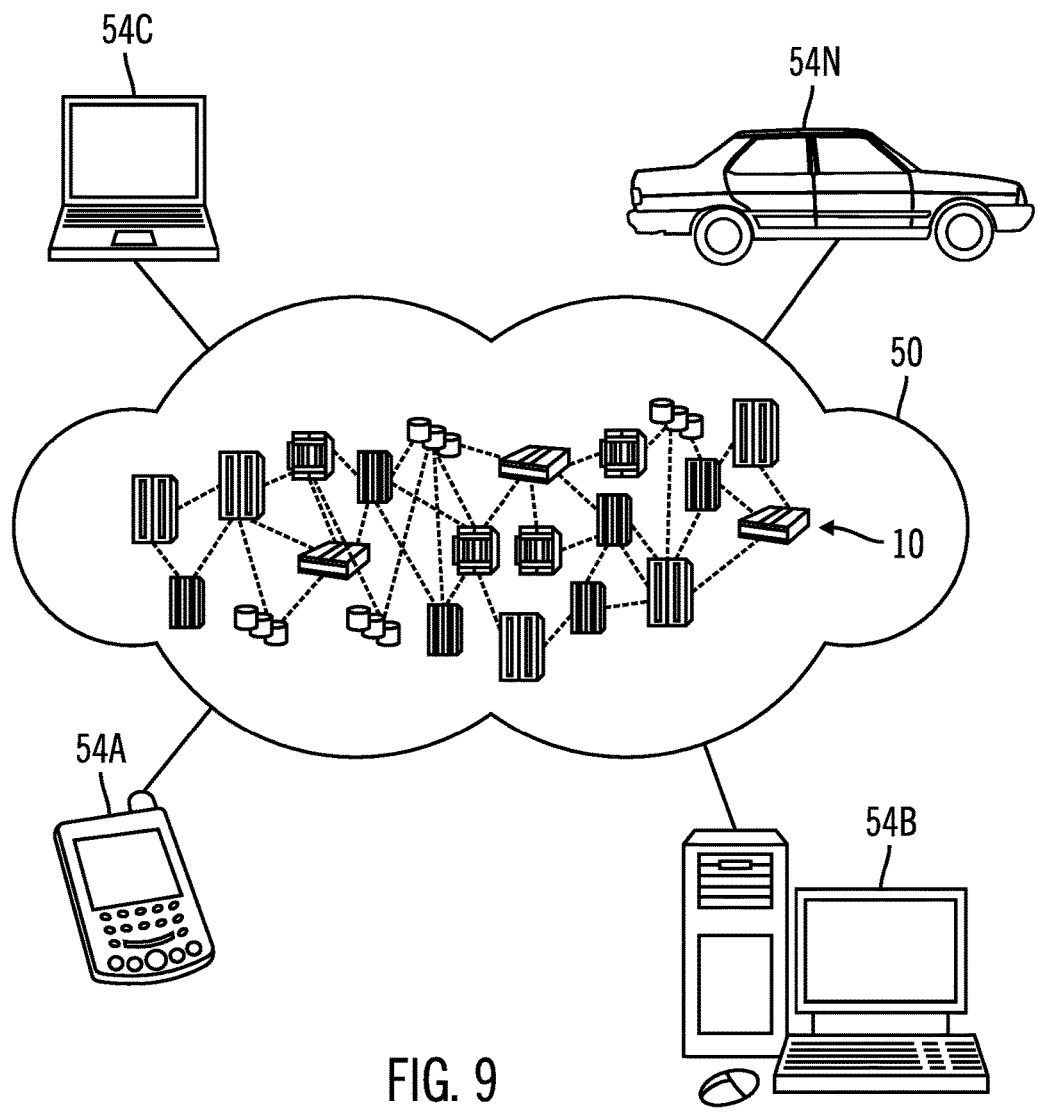
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
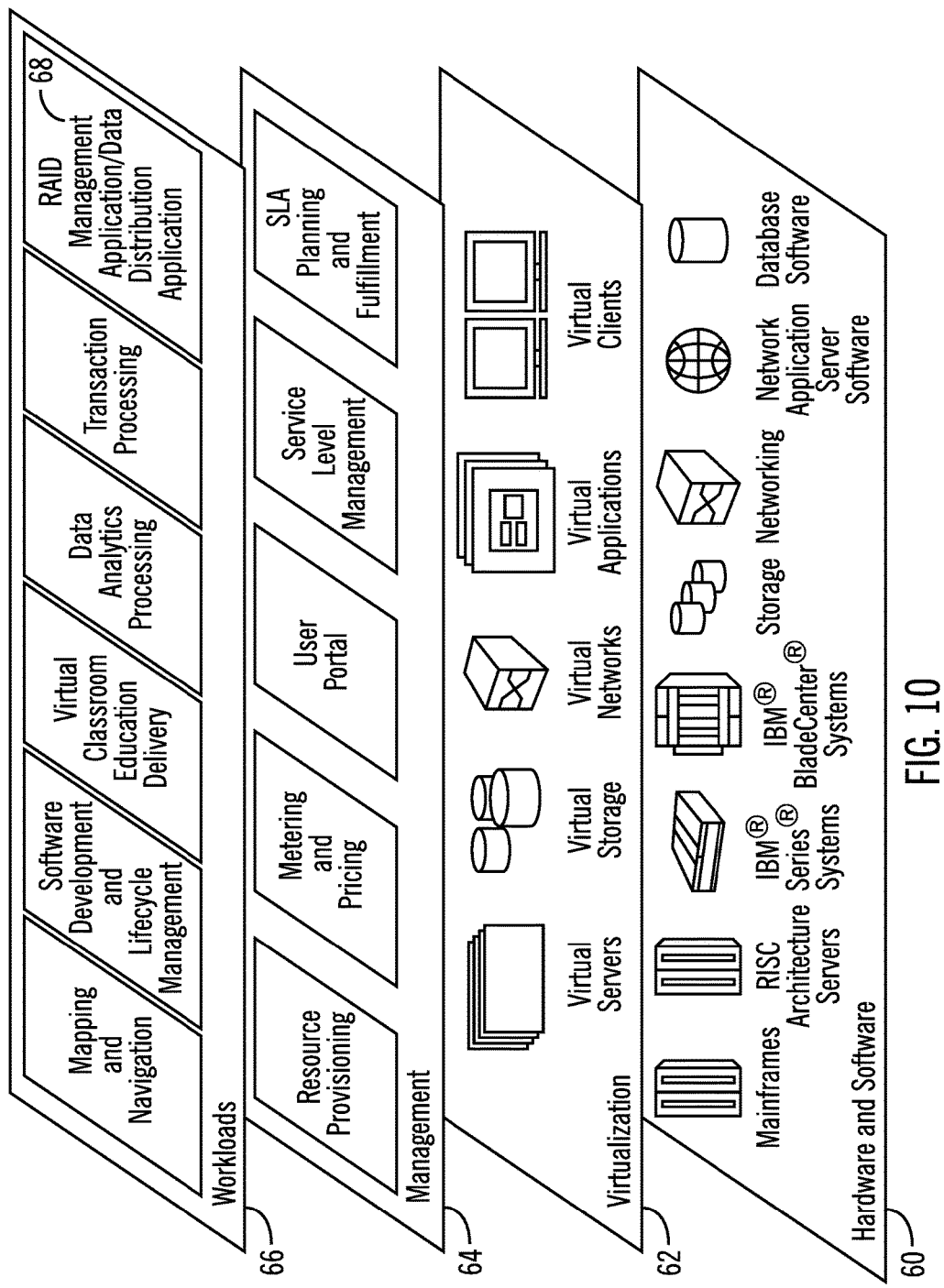
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems;

RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the RAID management application 122 and the data distribution application 124 (shown via reference numeral 68 in FIG. 10) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
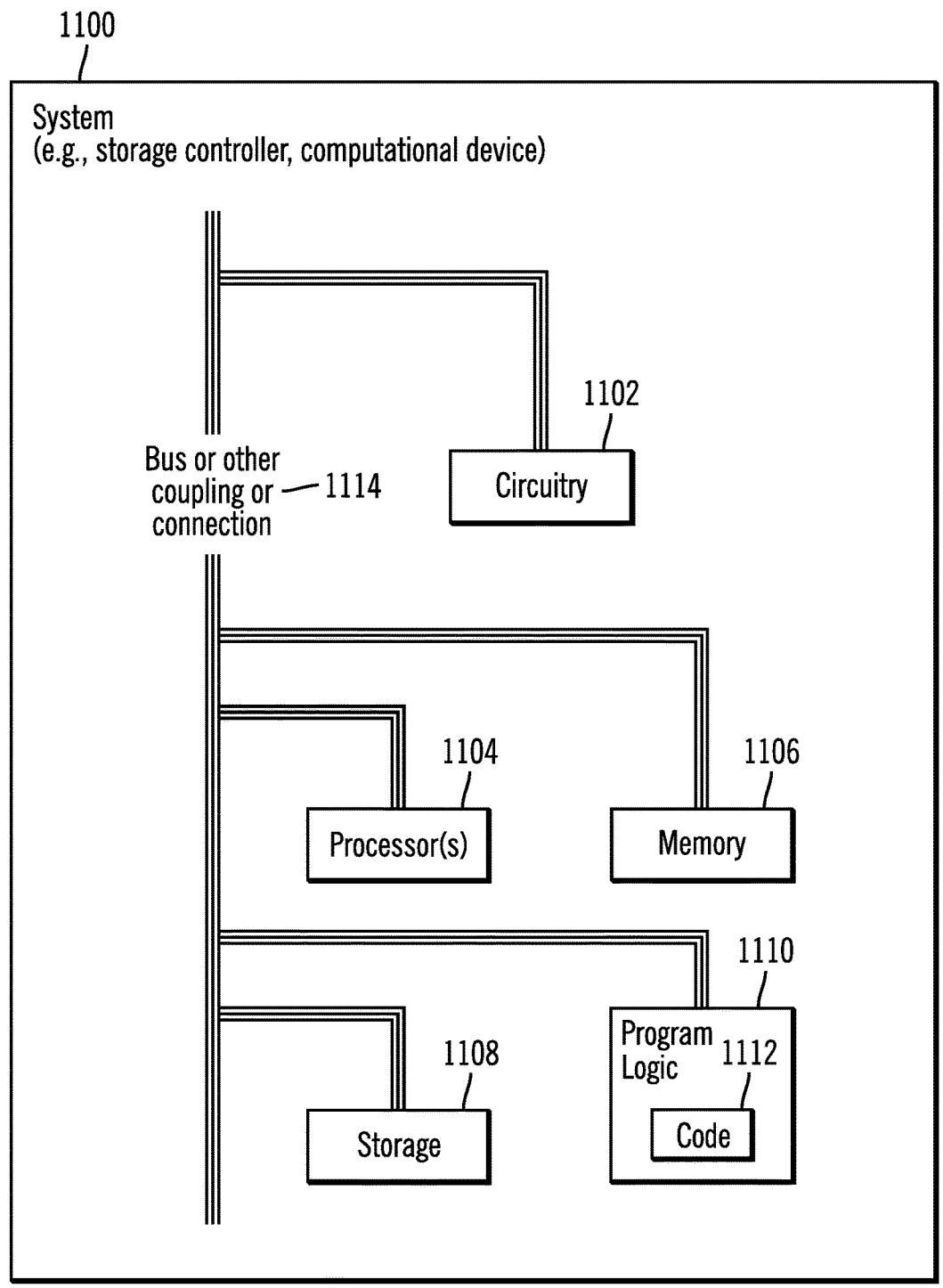
FIG. 11 illustrates a block diagram of a computational system that shows certain elements that may be included in the storage controller including servers shown in FIG. 1, in accordance with certain embodiments.

FIG. 11 illustrates a block diagram that shows certain elements that may be included in the storage controller 102, the servers 110, 112, the hosts 106, 108 or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device.

The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    associating, in a computational device, a plurality of identifiers with a plurality of data elements, wherein a first data element and a second data element of the plurality of data elements are both associated with a first identifier of the plurality of identifiers;
    storing, by the computational device, the first data element with which the first identifier is associated, in a first cloud storage maintained by a first entity; and
    storing, by the computational device, the second data element with which the first identifier is associated, in a second cloud storage maintained by a second entity, wherein the first cloud storage is different from the second cloud storage, and wherein data elements that are associated with an identical identifier are stored in cloud storages provided by different entities, wherein a user identifier and a corresponding password are associated with the identical identifier to indicate that the user identifier and the corresponding password are keys to a secure system, and wherein the user identifier is stored in the first cloud storage maintained by the first entity, and one part of the corresponding password is stored in the second cloud storage maintained by the second entity, and another part of the corresponding password is stored in a third cloud storage maintained by a third entity.

2. The method of claim 1, wherein the computational device is a storage controller coupled to a plurality of hosts, wherein the first cloud storage is separated at least by 10 kilometers from the second cloud storage, and wherein the first entity and the second entity are different vendors that provide cloud computing services to the storage controller for the plurality of hosts.

3. The method of claim 1, wherein a plurality of cloud storages maintained by a plurality of entities are structured as a redundant array of independent disks (RAID) by a RAID management application that executes in the computational device, and wherein a data element is distributed across the RAID, and wherein in response to a compromise of one of the plurality of cloud storages, only a part of the data element is compromised.

4. The method of claim 3, wherein data information and parity information in the RAID are stored in cloud storages provided by different entities, wherein a customer provides a granularity of striping for structuring the RAID, and wherein in response to determining that a cloud storage is not operational, data or parity is read from one or more remaining cloud storages to reconstruct data in the cloud storage that is not operational.

5. The method of claim 1, wherein different types of entries of a database are stored in cloud storages provided by different entities, and wherein a first type of entry comprises names, and a second type of entry comprises addresses corresponding to the names, and wherein the names are stored in a third cloud storage provided by a third entity, and the addresses are stored in a fourth cloud storage provided by a fourth entity.

6. The method of claim 1, wherein different regions of a spreadsheet are stored in cloud storages provided by different entities.

7. The method of claim 1, wherein a third data element and a fourth data element of the plurality of data elements are both associated with a second identifier of the plurality of identifiers, the method further comprising;
    storing, by a computational device, the third data element with which the second identifier is associated, in the first cloud storage maintained by the first entity; and
    storing, by the computational device, the fourth data element with which the second identifier is associated, in the second cloud storage maintained by the second entity.

8. A system, comprising:
    a memory; and
    a processor coupled to the memory, wherein the processor performs operations, the operations comprising:
    associating a plurality of identifiers with a plurality of data elements, wherein a first data element and a second data element of the plurality of data elements are both associated with a first identifier of the plurality of identifiers;
    storing the first data element with which the first identifier is associated, in a first cloud storage maintained by a first entity; and
    storing the second data element with which the first identifier is associated, in a second cloud storage maintained by a second entity, wherein the first cloud storage is different from the second cloud storage, and wherein data elements that are associated with an identical identifier are stored in cloud storages provided by different entities, wherein a user identifier and a corresponding password are associated with the identical identifier to indicate that the user identifier and the corresponding password are keys to a secure system, and wherein the user identifier is stored in the first cloud storage maintained by the first entity, and one part of the corresponding password is stored in the second cloud storage maintained by the second entity, and another part of the corresponding password is stored in a third cloud storage maintained by a third entity.

9. The system of claim 8, wherein the system is a storage controller coupled to a plurality of hosts, wherein the first cloud storage is separated at least by 10 kilometers from the second cloud storage, and wherein the first entity and the second entity are different vendors that provide cloud computing services to the storage controller for the plurality of hosts.

10. The system of claim 8, wherein a plurality of cloud storages maintained by a plurality of entities are structured as a redundant array of independent disks (RAID) by a RAID management application, and wherein a data element is distributed across the RAID, and wherein in response to a compromise of one of the plurality of cloud storages, only a part of the data element is compromised.

11. The system of claim 10, wherein data information and parity information in the RAID are stored in cloud storages provided by different entities, and wherein a customer provides a granularity of striping for structuring the RAID, and wherein in response to determining that a cloud storage is not operational, data or parity is read from one or more remaining cloud storages to reconstruct data in the cloud storage that is not operational.

12. The system of claim 8, wherein different types of entries of a database are stored in cloud storages provided by different entities, wherein a first type of entry comprises names, and a second type of entry comprises addresses corresponding to the names, and wherein the names are stored in a third cloud storage provided by a third entity, and the addresses are stored in a fourth cloud storage provided by a fourth entity.

13. The system of claim 8, wherein different regions of a spreadsheet are stored in cloud storages provided by different entities.

14. The system of claim 8, wherein a third data element and a fourth data element of the plurality of data elements are both associated with a second identifier of the plurality of identifiers, the operations further comprising;
storing, by a computational device, the third data element with which the second identifier is associated, in the first cloud storage maintained by the first entity; and
storing, by the computational device, the fourth data element with which the second identifier is associated, in the second cloud storage maintained by the second entity.

15. A computer program product, the computer program product comprising a computer readable storage medium having computer readable program code embodied therewith, the computer readable program code configured to perform operations in a computational device, the operations comprising:
associating, in the computational device, a plurality of identifiers with a plurality of data elements, wherein a first data element and a second data element of the plurality of data elements are both associated with a first identifier of the plurality of identifiers;
storing, by the computational device, the first data element with which the first identifier is associated, in a first cloud storage maintained by a first entity; and
storing, by the computational device, the second data element with which the first identifier is associated, in a second cloud storage maintained by a second entity, wherein the first cloud storage is different from the second cloud storage, and wherein data elements that are associated with an identical identifier are stored in cloud storages provided by different entities, wherein a user identifier and a corresponding password are associated with the identical identifier to indicate that the user identifier and the corresponding password are keys to a secure system, and wherein the user identifier is stored in the first cloud storage maintained by the first entity, and one part of the corresponding password is stored in the second cloud storage maintained by the second entity, and another part of the corresponding password is stored in a third cloud storage maintained by a third entity.

16. The computer program product of claim 15, wherein the computational device is a storage controller coupled to a plurality of hosts, wherein the first cloud storage is separated at least by 10 kilometers from the second cloud storage, and wherein the first entity and the second entity are different vendors that provide cloud computing services to the storage controller for the plurality of hosts.

17. The computer program product of claim 15, wherein a plurality of cloud storages maintained by a plurality of entities are structured as a redundant array of independent disks (RAID) by a RAID management application that executes in the computational device, and wherein a data element is distributed across the RAID, and wherein in response to a compromise of one of the plurality of cloud storages, only a part of the data element is compromised.

18. The computer program product of claim 17, wherein data information and parity information in the RAID are stored in cloud storages provided by different entities, wherein a customer provides a granularity of striping for structuring the RAID, and wherein in response to determining that a cloud storage is not operational, data or parity is read from one or more remaining cloud storages to reconstruct data in the cloud storage that is not operational.

19. The computer program product of claim 15, wherein different types of entries of a database are stored in cloud storages provided by different entities, wherein a first type of entry comprises names, and a second type of entry comprises addresses corresponding to the names, and wherein the names are stored in a third cloud storage provided by a third entity, and the addresses are stored in a fourth cloud storage provided by a fourth entity, and wherein different regions of a spreadsheet are stored in cloud storages provided by different entities.

20. The computer program product of claim 15, wherein a third data element and a fourth data element of the plurality of data elements are both associated with a second identifier of the plurality of identifiers, the operations further comprising;
storing, by a computational device, the third data element with which the second identifier is associated, in the first cloud storage maintained by the first entity; and
storing, by the computational device, the fourth data element with which the second identifier is associated, in the second cloud storage maintained by the second entity.

* * * * *